(12) United States Patent
Mudigonda et al.

(10) Patent No.: US 11,989,199 B2
(45) Date of Patent: May 21, 2024

(54) OPTIMIZING FLOW OF DATA WITHIN ETL DATA PROCESSING PIPELINE

(71) Applicant: International Business Machines Corporation, Armonk, NY (US)

(72) Inventors: Srinivas Mudigonda, Hyderabad (IN); Syam Dulla, Hyderabad (IN); Namit Kabra, Hyderabad (IN); Alekhya Telekicherla, Pennant Hills (AU)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 17/469,679

(22) Filed: Sep. 8, 2021

(65) Prior Publication Data

US 2023/0074414 A1    Mar. 9, 2023

(51) Int. Cl.
  *G06F 16/25* (2019.01)
  *G06F 16/21* (2019.01)
  *G06F 16/22* (2019.01)

(52) U.S. Cl.
  CPC .......... *G06F 16/254* (2019.01); *G06F 16/211* (2019.01); *G06F 16/221* (2019.01)

(58) Field of Classification Search
  CPC ..... G06F 16/211; G06F 16/221; G06F 16/254
  USPC ...................................................... 707/602
  See application file for complete search history.

(56) References Cited

U.S. PATENT DOCUMENTS

| | | | |
|---|---|---|---|
| 9,396,037 B2 | 7/2016 | Morsi et al. | |
| 2012/0154405 A1* | 6/2012 | Baumgartner | G06F 16/2433 345/440 |
| 2016/0350209 A1* | 12/2016 | Belyy | G06F 8/70 |
| 2017/0213174 A1 | 7/2017 | Deshpande et al. | |
| 2017/0371940 A1* | 12/2017 | Chintakayala | G06F 16/254 |
| 2019/0213198 A1* | 7/2019 | Kannan | G06F 16/254 |

(Continued)

OTHER PUBLICATIONS

Wasserman et al., "How to Accelerate your ETL Pipelines From 18 hours to as Fast as 5 Minutes with Azure Databricks," https://databricks.com/blog/2020/08/18/how-to-accelerate-your-etl-pipelines-from-18-hours-to-as-fast-as-5-minutes-with-azure-databricks.html, Aug. 18, 2020, pp. 1-9.

(Continued)

*Primary Examiner* — Robert W Beausoliel, Jr.
*Assistant Examiner* — Lauren Zannah Ganger
(74) *Attorney, Agent, or Firm* — Shackelford, Bowen, McKinley & Norton, LLP; Robert A. Voigt, Jr.

(57) ABSTRACT

A computer-implemented method, system and computer program product for optimizing a flow of data within transform, load (ETL) data processing pipelines. Database columns from a source database that are to be transformed as well as not transformed in the data processing stages of a processing segment of an ETL data processing pipeline are identified. Those database columns that are to be transformed are grouped into a processing schema. Transformations are then performed on the database columns of the processing schema. Those database columns that are not to be transformed are grouped into a non-processing schema. A large object data type (LOB) is then created to reference the non-processing schema. An identifier is created and inserted in the data processing stages to identify the LOB in replace of the database columns that are not to be transformed thereby avoiding the copying of the database columns that are not to be transformed.

20 Claims, 8 Drawing Sheets

(56) References Cited

U.S. PATENT DOCUMENTS

2021/0365464 A1\* 11/2021 Willcox ............ G06F 16/24552

OTHER PUBLICATIONS

Progress, "ETL On-Premises Oracle Data to Google BigQuery using Google Cloud Dataflow," https://www.progress.com/tutorials/cloud-and-hybrid/etl-on-premises-oracle-data-to-google-bigquery-using-google-cloud-dataflow, 2021, pp. 1-13.
GoogleCloud, "Migrating Data Warehouses to BigQuery: Data Pipelines," https://cloud.google.com/architecture/dw2bq/dw-bq-data-pipelines, 2021, pp. 1-25.
Liu et al., "An ETL Optimization Framework Using Partitioning and Parallelization," 30th Annual ACM Symposium on Applied Computing, Apr. 13-17, 2015, Salamanca, Spain, pp. 1015-1022.
Simitsis et al., "Optimizing Analytic Data Flows for Multiple Execution Engines," Proceedings of the 2012 ACM SIGMOD International Conference on Management of Data, Scottsdale, Arizona, U.S.A., May 20-24, 2012, pp. 829-840.

\* cited by examiner

OPTIMIZING FLOW OF DATA WITHIN ETL DATA PROCESSING PIPELINE

TECHNICAL FIELD

The present disclosure relates generally to extract, transform, load (ETL) data processing pipelines, and more particularly to optimizing the flow of data within ETL data processing pipelines by enabling database columns not undergoing transformations to avoid being copied between stages in a segment of the ETL data processing pipeline.

BACKGROUND

In computing, extract, transform, load (ETL) is the general procedure of copying data from one or more sources into a destination system which represents the data differently from the source(s) or in a different context than the source(s).

SUMMARY

In one embodiment of the present disclosure, a computer-implemented method for optimizing a flow of data within extract, transform, load (ETL) data processing pipelines comprises identifying which database columns from a source database are to be transformed in data processing stages of a processing segment of a ETL data processing pipeline and which database columns from the source database are not to be transformed in the data processing stages of the processing segment of the ETL data processing pipeline. The method further comprises grouping database columns to be transformed into a processing schema. The method additionally comprises performing transformations on the database columns of the processing schema. Furthermore, the method comprises grouping database columns that are not be transformed into a non-processing schema. Additionally, the method comprises creating a large object data type to reference the non-processing schema. In addition, the method comprises creating and inserting an identifier in the data processing stages to identify the large object data type thereby avoiding copying of the database columns that are not to be transformed in the data processing stages.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
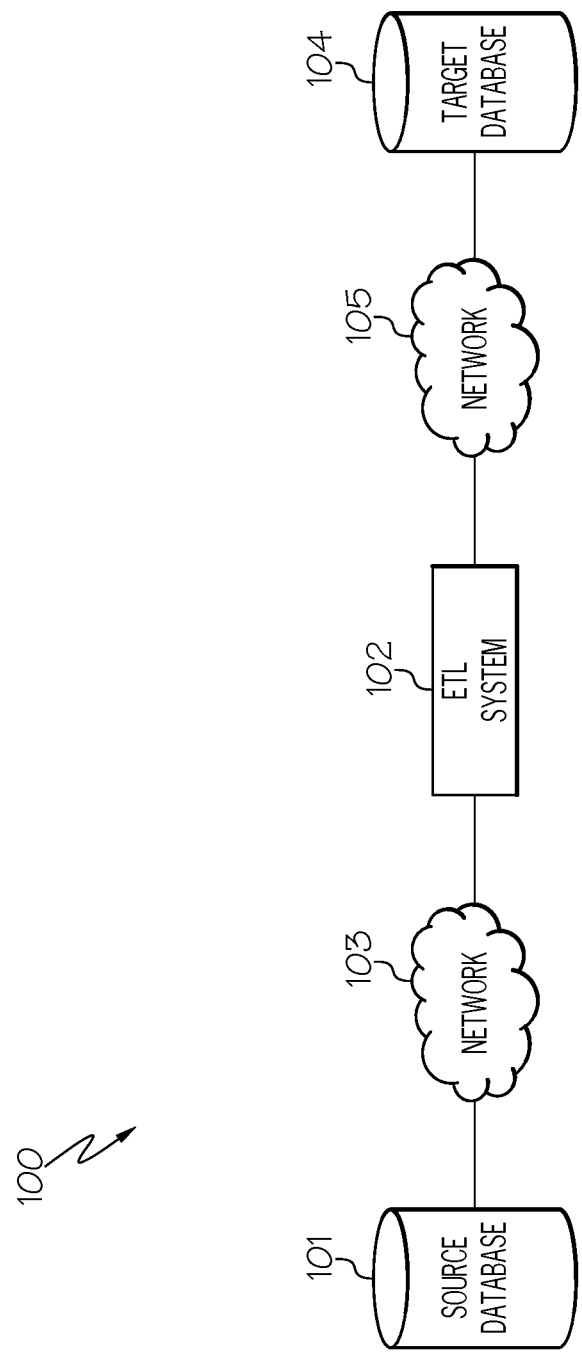
FIG. 1 illustrates a communication system for practicing the principles of the present disclosure in accordance with an embodiment of the present disclosure.

As stated in the Background section, in computing, extract, transform, load (ETL) is the general procedure of copying data from one or more sources into a destination system which represents the data differently from the source (s) or in a different context than the source(s).

Data extraction of the ETL procedure involves extracting data from homogeneous or heterogeneous sources; data transformation of the ETL procedure processes data by data cleaning and transforming them into a proper storage format/structure for the purposes of querying and analysis; finally, data loading of the ETL procedure describes the insertion of data into the final target database, such as an operational data store, a data mart, a data lake or a data warehouse.

A properly designed ETL system extracts data from the source systems, enforces data quality and consistency standards, conforms data so that separate sources can be used together, and finally delivers data in a presentation-ready format so that application developers can build applications and end users can make decisions.

Since the data extraction takes time, it is common to execute the three phases in a data processing pipeline (or simply referred to as "pipeline"). While the data is being extracted, another transformation process executes while processing the data already received and prepares it for loading while the data loading begins without waiting for the completion of the previous phases.

In a traditional ETL pipeline, data is processed in batches from source databases to a target database (e.g., data warehouse). In the traditional ETL pipeline, transformations may be defined and performed on some of the database columns; whereas, transformations may not be defined and performed on other database columns. A database column (also referred to herein as simply "column"), as used herein, refers to a set of data values of a particular type, one value for each row of the database. A database column may contain text values, numbers or even pointers to files in the operating system. Database columns typically contain simple types though some relational database systems allow database columns to contain more complex data types, such as whole documents, images or video clips.

Unfortunately, in traditional ETL pipelines, database columns are copied across the different stages (major divisions of the pipeline) of the ETL pipeline from the source database to the target database even though such database columns may not be transformed. Such copying results in a significant amount of input/output operations being performed which utilizes a significant amount of processing resources which results in slower performance.

The embodiments of the present disclosure provide a means for avoiding the copying of database columns that are not to be transformed in the data processing stages of a processing segment of the ETL data processing pipeline by grouping such database columns into a non-processing schema and creating a large objet data type to reference such a non-processing schema. An identifier that references the large object data type is inserted in the data processing stages as opposed to the database columns that are not to be transformed thereby avoiding the copying of such database columns resulting in a reduction of processing resources being used in the execution of the ETL data processing pipeline.

In some embodiments of the present disclosure, the present disclosure comprises a computer-implemented method, system and computer program product for optimizing a flow of data within extract, transform, load (ETL) data processing pipelines. In one embodiment of the present disclosure, database columns from a source database that are to be transformed in the data processing stages of a processing segment of an ETL data processing pipeline as well as the database columns from the source database that are not to be transformed in the data processing stages of the processing segment of the ETL data processing pipeline are identified. A "segment" of the ETL data processing pipeline, as used herein, refers to a section or portion of the ETL data processing pipeline. Those database columns that are to be transformed are grouped into a processing schema. A "schema," as used herein, refers to a structure or organization of data. A "processing schema," as used herein, refers to a schema for database columns that are to be processed (transformed). Transformations are then performed on the database columns of the processing schema. Furthermore, those database columns that are not to be transformed are grouped into a non-processing schema. A "non-processing schema," as used herein, refers to a schema for database columns that are not to be processed (transformed). A large object data type (LOB) is then created to reference the non-processing schema. In one embodiment, the LOB is a collection of datatypes which are designed to hold a large amount of data. Furthermore, an identifier is created and inserted in the data processing stages to identify the LOB in replace of the database columns that are not to be transformed thereby avoiding the copying of the database columns that are not to be transformed in the data processing stages. In this manner, the copying of such database columns is avoided thereby enabling such database columns to simply pass-through from the source database to the target database. As a result, there is a reduction in the processing resources being used in the execution of the ETL data processing pipeline.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a source database 101 connected to an extract, transform, load (ETL) system 102 via a network 103. Furthermore, as illustrated in FIG. 1, ETL system 102 is connected to a target database 104 via a network 105. While FIG. 1 illustrates two separate networks 103, 105, it is noted that system 100 may include a single network or more than the two networks to interconnect ETL system 102 with source database 101 and target database 104.

Source database 101 is configured to store the source data which is copied by ETL system 102 into target database 104 which represents the data differently from the source(s) or in a different context than the source(s). In connection with such a procedure, the steps of extraction, transformation and load are performed by ETL system 102. For example, data extraction involves extracting data from source database 101. Data transformation processes data by data cleaning and transforming them into a proper storage format/structure for the purpose of querying and analysis. In one embodiment, data transformation is comprised of several sub-processes: cleansing (inconsistencies and missing values in the data are resolved), standardization (formatting rules are applied to the data set), deduplication (redundant data is excluded or discarded), verification (unusable data is removed and anomalies are flagged), sorting (data is organized according to type) and other tasks (any additional/optional rules can be applied to improve data quality). Data loading describes the insertion of data into a destination (e.g., target database 104), such as an operational data store, a data mart, a data lake or a data warehouse. In one embodiment, data can be loaded all at once (full load) or at scheduled intervals (incremental load).

In one embodiment, such data sources are in a federated environment in which the data sources are combined to form one large data source, such as represented by source database 101 in FIG. 1. In one embodiment, such data sources are disparate data sources including, but not limited to, data warehouses, data marts, and/or data lakes. Other examples include, but not limited to, database and legacy systems, cloud, hybrid and on-premises environments, sales and marketing applications, mobile devices and applications, customer relationship management (CRM) systems, data storage platforms, and analytics tools.

In one embodiment, target database 104 represents the destination of the data loading described above. In one embodiment, target database 104 corresponds to an operational data store, a data mart, a data lake or a data warehouse.

Networks 103, 105 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Furthermore, as discussed above, ETL system 102 corresponds to a system that copies data from one or more data sources of source database 101 into a destination system, such as target database 104, which represents the data differently from the source(s) or in a different context than the source(s). Furthermore, in one embodiment, ETL system 102 is configured to optimize the flow of data within the ETL data processing pipeline by avoiding the copying of database columns that are not to be transformed in the data processing stages of a processing segment of the ETL data processing pipeline, such as by grouping such database columns into a non-processing schema and creating a large objet data type to reference such a non-processing schema. An identifier that references the large object data type is inserted in the data processing stages as opposed to the database columns that are not to be transformed thereby avoiding the copying of such database columns resulting in a reduction of processing resources being used in the execution of the ETL data processing pipeline. A more detailed description of these and other functions of ETL system 102 is provided further below. Furthermore, a description of the software components of ETL system 102 is provided below in connection with FIGS. 2-5 and a description of the hardware configuration of ETL system 102 is provided further below in connection with FIG. 6.

System 100 is not to be limited in scope to any one particular network architecture. System 100 may include any number of source databases 101, ETL systems 102, networks 103, 105 and target databases 104.

A discussion regarding the software components used by ETL system 102 to optimize the flow of data within the ETL data processing pipeline is provided below in connection with FIG. 2.

Figure 2:
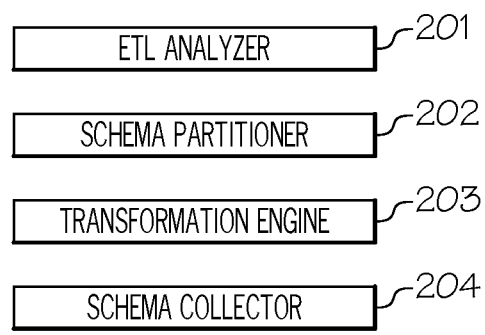
FIG. 2 is a diagram of the software components of the extract, transform, load (ETL) system used to optimize the flow of data within the ETL data processing pipeline in accordance with an embodiment of the present disclosure.

FIG. 2 is a diagram of the software components of ETL system 102 (FIG. 1) used to optimize the flow of data within the ETL data processing pipeline in accordance with an embodiment of the present disclosure.

Referring to FIG. 2, in conjunction with FIG. 1, ETL system 102 includes an ETL analyzer 201 configured to analyze the ETL data processing pipeline to identify the data processing stages (also referred to as simply "processing stages"). In one embodiment, the ETL data processing pipeline represents the flow of data between source database 101 and target database 104. In one embodiment, the ETL data processing pipeline includes a set of instructions that determines how and when to move data between source database 101 and target database 104.

Furthermore, in one embodiment, the ETL data processing pipeline includes stages or major divisions of the ETL data processing pipeline, such as the data extraction, data transformation (referred to herein as the "data processing" stage), and data loading. Examples of such an ETL analyzer 201 to identify the data processing stages include, but not limited to, Xplenty®, Talend®, Stitch, Informatica® PowerCenter®, Oracle® Data Integrator, Skyvia®, Fivetran®, etc.

In one embodiment, ETL analyzer 201 is further configured to identify the data processing stages in each segment of the ETL data processing pipeline in scenarios in which the ETL data processing pipeline includes multiple segments. A "segment" of the ETL data processing pipeline, as used herein, is a section or portion of the ETL data processing pipeline. In one embodiment, the ETL data processing pipeline is divided into multiple segments to perform the ETL process on different sources of data, such as performing the ETL process on historic and current data involving sales data in a shopping mall (one segment) as well as performing the ETL process to integrate the data from one organization to another organization (another segment). In one embodiment, such segments are identified based on identifying different sources of data to be extracted, transformed and loaded. Examples of such an ETL analyzer 201 to identify such segments in addition to identifying the processing stages in each segment of the ETL data processing pipeline include, but not limited to, Xplenty®, Talend®, Stitch, Informatica® PowerCenter®, Oracle® Data Integrator, Skyvia®, Fivetran®, etc.

ETL system 102 further includes a schema partitioner 202 configured to analyze the database columns of the source data from source database 101 in the identified data processing stages (transformation stages) of a segment of the ETL data processing pipeline. In one embodiment, the ETL data processing pipeline may include multiple segments. As discussed above, ETL analyzer 201 is configured to identify the data processing stages (transformation stages) in each segment of the ETL data processing pipeline. For each segment, schema partitioner 202 identifies which database columns are to be transformed in the data processing stages and which database columns are not to be transformed in the data processing stages. A database column (also referred to herein as simply "column"), as used herein, refers to a set of data values of a particular type, one value for each row of the database. A database column may contain text values, numbers or even pointers to files in the operating system. Database columns typically contain simple types though some relational database systems allow database columns to contain more complex data types, such as whole documents, images or video clips.

In one embodiment, schema partitioner 202 determines which database columns are to be transformed and which database columns are not to be transformed based on the set of technical and business rules that have been extracted from the source(s), such as source database 101. Such technical and business rules are used to transform the source data, which also indicate which database columns are to be transformed. In such an embodiment, schema partitioner 202 utilizes natural language processing to identify such technical and business rules. In one embodiment, such rules are identified based on identifying keywords which indicate such rules, where such keywords are listed in a data structure (e.g., table). In one embodiment, such a data structure is stored in a storage device of ETL system 102 (e.g., memory, disk drive). In one embodiment, schema partitioner 202 identifies the database columns to be transformed based on identifying the identification of such database columns preceding or succeeding such identified keywords.

In one embodiment, data in the ETL data processing pipeline is transformed based on the scripting language (e.g., Python®) or domain-specific language (e.g., SQL) prepared by data analysts, data engineers and data scientists to transform the data. In one embodiment, schema partitioner 202 examines such language to determine which database columns are to be transformed and which database columns are not be transformed in the data processing stages of the segment of the ETL data processing pipeline. In one embodiment, schema partitioner 202 utilizes natural language processing to identify transformations (e.g., filtering, aggregating, data cleansing, etc.) based on identifying keywords which indicate such transformations, where such keywords are listed in a data structure (e.g., table). In one embodiment, such a data structure is stored in a storage device of ETL system 102 (e.g., memory, disk drive). In one embodiment, schema partitioner 202 identifies the database columns to be transformed based on identifying the identification of such database columns preceding or succeeding such identified keywords.

In one embodiment, schema partitioner 202 uses a machine learning algorithm (e.g., supervised learning) to build a mathematical model based on sample data consisting of data transformations (e.g., cleansing, standardization, deduplication, sorting, filtering, aggregating, bucketing, normalizing, etc.) using scripting or domain-specific languages and the database columns that were transformed. Such data may be obtained and tabulated by experts, who in turn, utilize such information to develop the sample data. Such a data set is referred to herein as the "training data" which is used by the machine learning algorithm to make predictions or decisions without being explicitly programmed to perform the task. In one embodiment, the training data consists of data transformations (e.g., cleansing, standardization, deduplication, sorting, filtering, aggregating, bucketing, normalizing, etc.) using scripting or domain-specific languages and the associated database columns that are to be transformed. The algorithm iteratively makes predictions on the training data as to which database columns are to be transformed and is corrected by the expert until the predictions achieve the desired accuracy. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the database columns to be transformed based on the process of data transformations in the scripting or domain-specific languages.

In one embodiment, schema partitioner 202 groups the database columns to be transformed into a schema, referred to herein as the "processing schema." A "schema," as used herein, refers to a structure or organization of data. In one embodiment, the schema defines the tables, fields, relationships, views, indexes, packages, procedures, functions, queues, triggers, types, sequences, materialized views, synonyms, database links, directories, etc. in the database columns.

A "processing schema," as used herein, refers to a schema for database columns that are to be processed (transformed) by the transformation engine (discussed further below).

In one embodiment, schema partitioner 202 groups such database columns into the processing schema using tools, such as SQL Server Management Studio, Transact-SQL, DbSchema, SqlDBM, Visual Paradigm®, Erwin® Data Modeler, etc.

In one embodiment, schema partitioner 202 groups the database columns to not be transformed into a schema, referred to herein as the "non-processing schema." A "non-processing schema," as used herein, refers to a schema for database columns that are not to be processed (transformed) by the transformation engine (discussed further below).

In one embodiment, schema partitioner 202 groups such database columns into the non-processing schema using tools, such as SQL Server Management Studio, Transact-SQL, DbSchema, SqlDBM, Visual Paradigm®, Erwin® Data Modeler, etc.

In one embodiment, schema partitioner 202 creates a large object data type (LOB) to reference the non-processing schema. In one embodiment, the LOB is a collection of datatypes which are designed to hold a large amount of data. In one embodiment, a LOB is able to hold up to a maximum size ranging from 8 terabytes to 128 terabytes. In one embodiment, the LOB is stored in the data storage (e.g., memory, disk drive) of ETL system 102. In one embodiment, the LOB is either persistent or temporary. In one embodiment, the LOB is a read-only datatype.

In one embodiment, schema partitioner 202 creates an identifier to identify the created LOB. Such an identifier may consist of alphanumeric characters. In one embodiment, such an identifier is inserted in the data processing stages of the segment of the ETL data processing pipeline in replace of the database columns that are not to be transformed in the data processing stages. In this manner, copying of such database columns is avoided thereby enabling such database columns to simply pass-through from source database 101 to target database 104 as discussed in further detail below.

ETL system 102 further includes a transformation engine 203 configured to transform the database columns to be processed (transformed). Such database columns are identified from the processing schema. In one embodiment, transformation engine 203 performs the transformations on the database columns of the processing schema. Examples of such a transformation engine 203 include, but not limited to, SQL-MapReduce®, Apache® Spark, Kafka® Streams API, etc. In one embodiment, such transformations include, but not limited to, cleansing, standardization, deduplication, sorting, filtering, aggregating, bucketing, normalizing, format revision, key restricting, derivations, joining, splitting, validation, summarization, integration, etc.

ETL system 102 additionally includes a schema collector 204 configured to "collect" the processed schema and unprocessed schema (i.e., collect the processing schema and the non-processing schema). In one embodiment, schema collector 204 receives the identifier of the LOB. Upon receiving such identifier, schema collector 204 reads the large object data type (LOB) identified by the identifier and unpacks the non-processing schema referenced by the LOB for the grouped database columns that were not transformed. "Unpacking," as used herein, refers to removing the contents of the schema, such as the non-processing schema, in order to obtain the structure/organization of data for those database columns of the non-processing schema.

Additionally, in one embodiment, schema collector 204 receives the processing schema. That is, schema collector 204 receives the database columns that were transformed by transformation engine 203 from transformation engine 203. Schema collector 204 then unpacks the processing schema for the grouped database columns that were transformed. "Unpacking," as used herein, refers to removing the contents of the schema, such as the processing schema, in order to obtain the structure/organization of data for those database columns of the processing schema.

In one embodiment, schema collector 204 combines the unpacked non-processing schema and the unpacked processing schema to generate a "target schema." A "target schema," as used herein, refers to a schema for the target database 104. That is, the target schema refers to the structure or organization of data to be stored in target database 104.

Figure 3:
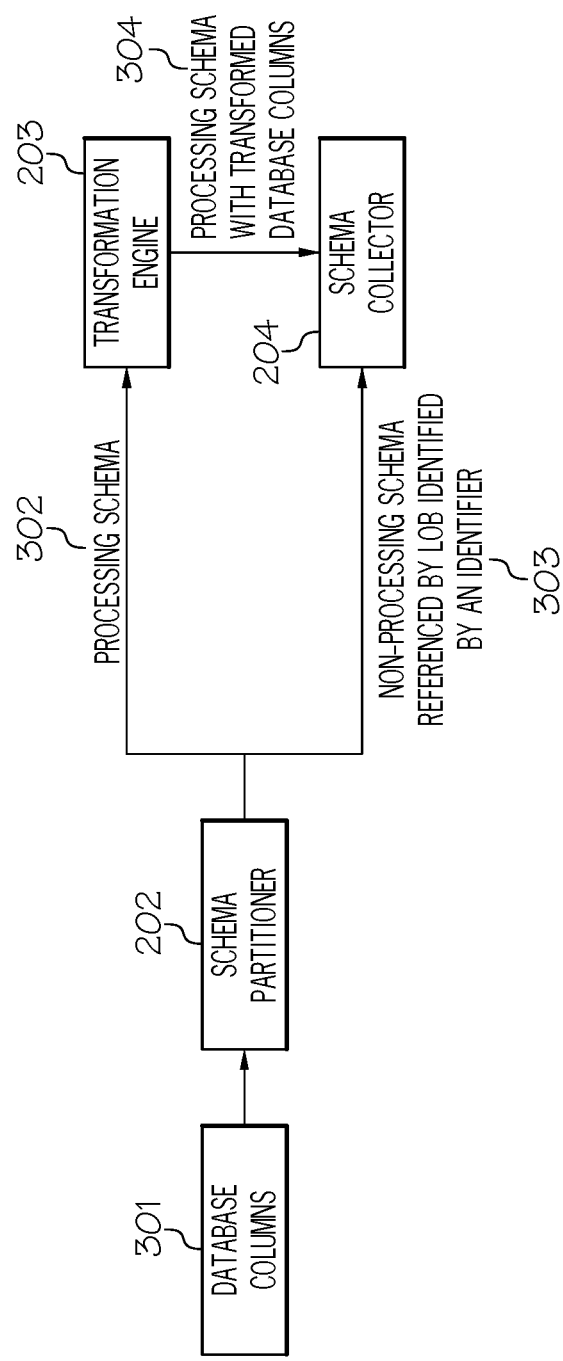
FIG. 3 illustrates partitioning database columns into different schemas based on whether or not the database columns are to be processed (transformed) in accordance with an embodiment of the present disclosure.
Figure 4:
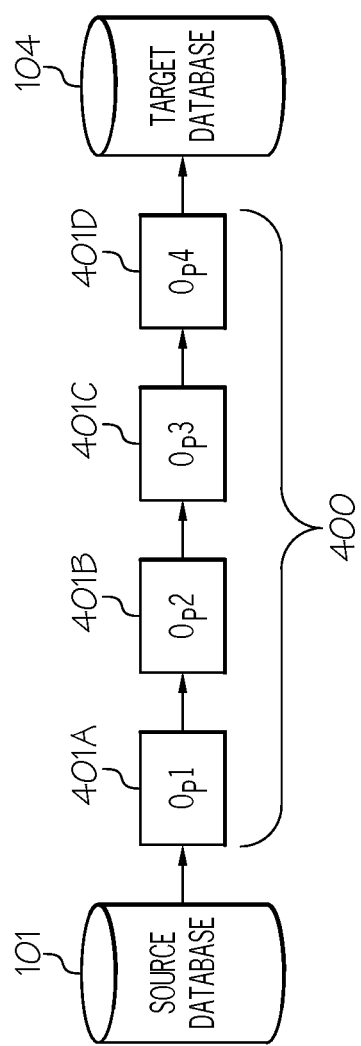
FIG. 4 illustrates an ELT data processing pipeline with various data processing stages in accordance with an embodiment of the present disclosure.
Figure 5:
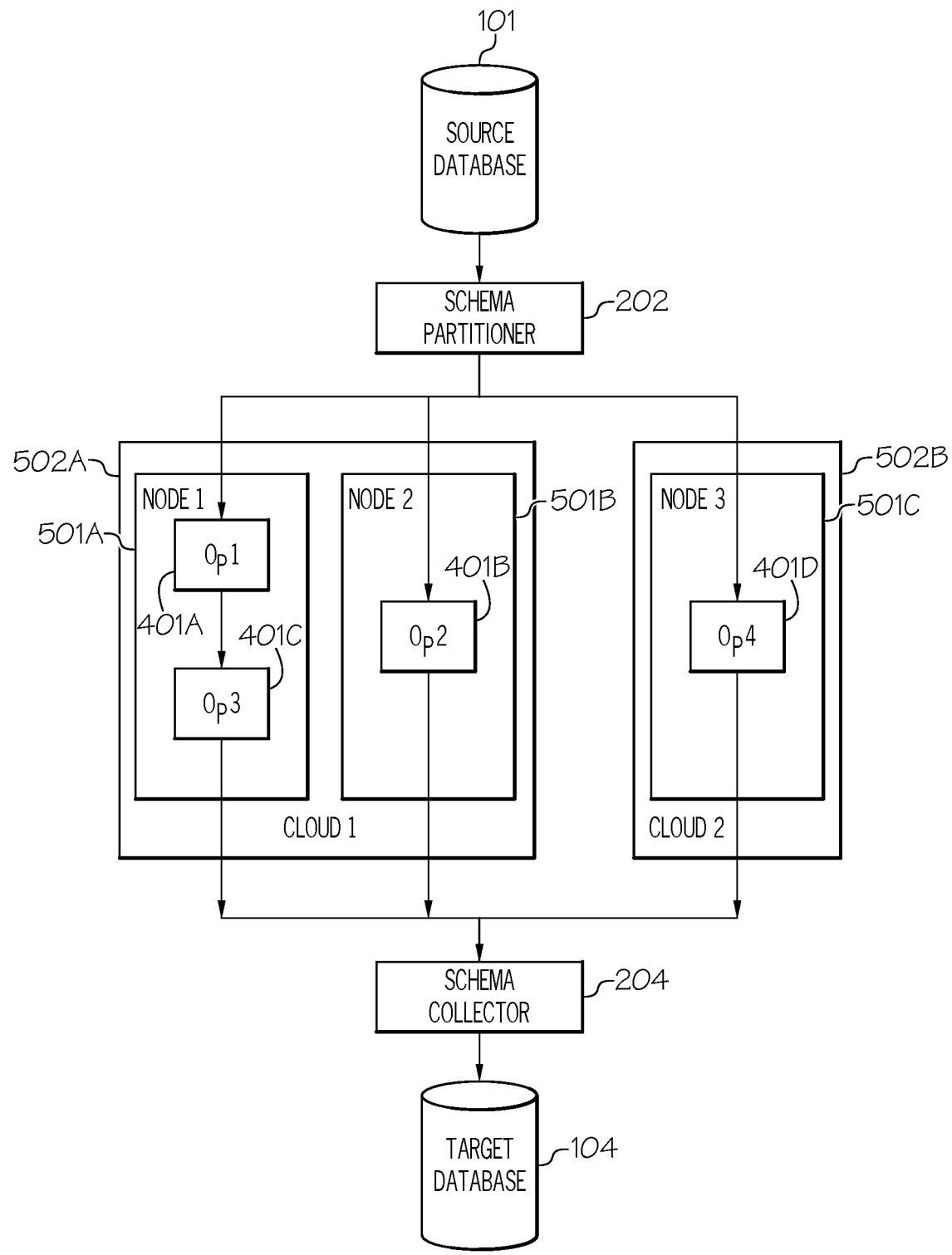
FIG. 5 illustrates data partitioning in a multi node/cloud environment in accordance with an embodiment of the present disclosure.

These and other functions will be discussed in further detail below in connection with FIGS. 3-6 and 7A-7B. In particular, a further discussion of the operations performed by schema partitioner 202, transformation engine 203 and schema collector 204 is discussed below in connection with FIGS. 3-5. FIG. 3 illustrates partitioning database columns into different schemas based on whether or not the database columns are to be processed (transformed). FIG. 4 illustrates an ELT data processing pipeline with various data processing stages. FIG. 5 illustrates data partitioning in a multi node/cloud environment.

As stated above, FIG. 3 FIG. 3 illustrates partitioning database columns into different schemas based on whether or not the database columns are to be processed (transformed) in accordance with an embodiment of the present disclosure.

Referring now to FIG. 3, in conjunction with FIGS. 1-2, database columns 301, such as the database columns that were extracted from the data obtained from source database 101, are analyzed to identify those database columns that are to be transformed in the data processing stages of the segment of the ETL data processing pipeline and those that are not to be transformed in the data processing stages of the segment of the ETL data processing pipeline.

As previously discussed, schema partitioner 202 groups those database columns that are to be transformed into a processing schema 302. Furthermore, schema partitioner 202 groups those database columns that are not to be transformed into a non-processing schema 303. As stated above, the non-processing schema 303 is referenced by a large object data type (LOB), which is identified by an identifier that is inserted in the data processing stages of the segment of the ETL data processing pipeline in replace of such non-processed database columns. Such an identifier is later received by schema collector 204.

As also previously discussed, processing schema 302 is processed by transformation engine 203 in which the database columns identified from the processing schema are processed (transformed) by transformation engine 203. Such a processed schema 304 (processing schema with transformed database columns) is then sent to schema collector 204, which unpacks the processing schema for the grouped database columns that were transformed.

Furthermore, as discussed above, schema collector 204 receives the identifier that identifies the large object data type (LOB). After reading the large object data type, schema collector 204 unpacks the non-processing schema that is referenced by the LOB (the grouped database columns that were not transformed). Schema collector 204 then combines the unpacked non-processing schema and the unpacked processing schema to generate the target schema for target database 104.

As previously discussed, a stage of the ETL data processing pipeline may include multiple data processing stages, such as shown in FIG. 4.

FIG. 4 illustrates an ELT data processing pipeline 400 with various data processing stages in accordance with an embodiment of the present disclosure.

As shown in FIG. 4, in conjunction with FIGS. 1-3, ELT data processing pipeline 400 consists of various stages, such as data processing stages (transformations) that are performed on the database columns 301 extracted from source database 101. After transforming such database columns, the transformed database columns are loaded into a destination, such as target database 104.

In one embodiment, the data processing stages consist of "operators" to perform such transformations. For example, data processing pipeline 400 includes operators 401A-401D (identified as "Op1," "Op2," "Op3," and "Op4," respectively, in FIG. 4). Operators 401A-401D may collectively or individually be referred to as operators 401 or operator 401, respectively. The data partitioning may be performed in a multi node/cloud environment using such a data processing pipeline 400 as discussed below in FIG. 5.

FIG. 5 illustrates data partitioning in a multi node/cloud environment in accordance with an embodiment of the present disclosure.

Referring to FIG. 5, in conjunction with FIGS. 1-4, schema partitioner 202 groups the database columns to be transformed into a processing schema. In one embodiment, schema partitioner 202 partitions the processing (transformations) of such database columns among various nodes/clouds as shown in FIG. 5.

For example, the operations (transformations) performed by operators Op1 401A and Op3 401C are executed in node 1 501A and the operation (transformation) performed by operator Op2 401B is executed in node 2 501B, where both nodes are contained with cloud 1 502A. Furthermore, as shown in FIG. 5, the operation (transformation) performed by Op4 401D is executed in node 3 501C contained within cloud 2 502B. The results of such operations (transformations) are collected by schema collector 204, which is used to generate a target schema for target database 104 as discussed above. Nodes 501A-501C may collectively or individually be referred to as nodes 501 or node 501, respectively. A "node" 501, as used herein, refers to an active, physical, electronic device attached to a network, such as the "cloud" environment. Clouds 502A-502B may collectively or individually be referred to as clouds 502 or cloud 502, respectively. A "cloud" (also referred to as the "cloud environment") 502, as used herein, refers to the network infrastructure, such as the servers that are accessed over the Internet. Nodes 501 may correspond to such servers that are utilized in such a network infrastructure.

It is noted that while four operators 401 are shown in data processing pipeline 400 of FIGS. 4 and 5 that data processing pipeline 400 may include any number of operators 401. Furthermore, while the multi node/cloud environment of FIG. 5 illustrates three nodes 501 and two cloud environments 502, the principles of the present disclosure may include any number of nodes 501 in a cloud environment 502 as well as include any number of cloud environments 502.

As discussed above, schema collector 204 receives the identifier that identifies the large object data type (LOB). In one embodiment, schema partitioner 202 passes the identifier that identifies the large object data type (LOB) to schema collector 204 through memory mapping when the ETL data processing pipeline is executed on the same nodes 501. Alternatively, in one embodiment, schema partitioner 202 passes the identifier that identifies the large object data type (LOB) to schema collector 204 over a network when the source and target stages are executed on different nodes 501. In one embodiment, schema partitioner 202 utilizes the software tool of Apache® Arrow or Apache® Arrow Flight to pass such an identifier to schema collector 204.

In one embodiment, schema partitioner 202 partitions the processing (transformations) of database columns among various nodes 501/clouds 502 using a machine learning algorithm (e.g., supervised learning) to build a mathematical model based on sample data consisting of cost, infrastructure, data protection rules, policies, specifications of nodes 501, current number of jobs to be processed by nodes 501, current amount of free resources by nodes 501, etc. to determine which nodes 501/cloud environments 502 to be utilized by an operator 401 to process (transform) database columns in an efficient manner. An "efficient" manner, as used herein, refers to processing the database columns in the quickest amount of time while using the least amount of processing resources. For example, nodes 501 that have greater processing availability may be utilized prior to other nodes 501 with less processing availability everything else being equal. In another example, nodes 501 that have already received a significant number of database columns to be processed may be less likely to receive additionally database columns to be processed in comparison to other nodes 501 that have processing availability.

Such data (e.g., current amount of free resources by nodes 501, specifications of nodes, etc.) may be obtained and tabulated by experts, who in turn, utilize such information to develop the sample data. Such a data set is referred to herein as the "training data" which is used by the machine learning algorithm to make predictions or decisions without being explicitly programmed to perform the task. In one embodiment, the training data consists of cost, infrastructure, data protection rules, policies, specifications of nodes 501, current number of jobs to be processed by nodes 501, current amount of free resources by nodes 501, etc. that are used to determine which nodes 501/clouds 502 are utilized in processing (transforming) the database columns in an efficient manner. The algorithm iteratively makes predictions on the training data (predicting which node 501/cloud 502 to be utilized by operator 401 to process database columns in an efficient manner) and is corrected by the expert until the predictions achieve the desired accuracy. Examples of such supervised learning algorithms include nearest neighbor, Naïve Bayes, decision trees, linear regression, support vector machines and neural networks.

In one embodiment, the mathematical model (machine learning model) corresponds to a classification model trained to predict which node 501/cloud 502 to be utilized by operator 401 to process database columns in an efficient manner.

A further description of these and other functions is provided below in connection with the discussion of the method for optimizing a flow of data within ETL data processing pipelines.

Prior to the discussion of the method for optimizing the flow of data within ETL data processing pipelines, a description of the hardware configuration of ETL system 102 (FIG. 1) is provided below in connection with FIG. 6.

Figure 6:
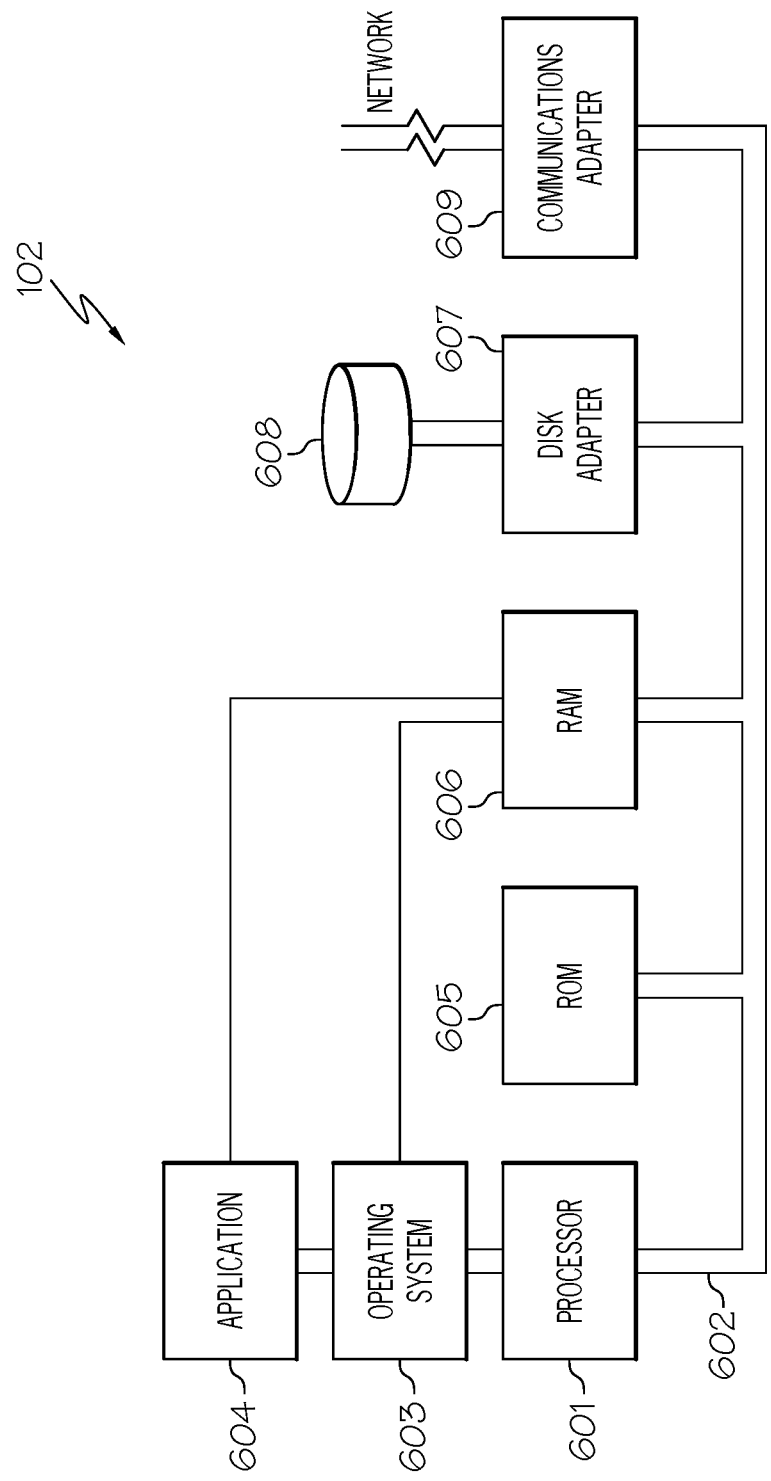
FIG. 6 illustrates an embodiment of the present disclosure of the hardware configuration of the ETL system which is representative of a hardware environment for practicing the present disclosure.

Referring now to FIG. 6, FIG. 6 illustrates an embodiment of the present disclosure of the hardware configuration of ETL system 102 (FIG. 1) which is representative of a hardware environment for practicing the present disclosure.

ETL system 102 has a processor 601 connected to various other components by system bus 602. An operating system 603 runs on processor 601 and provides control and coordinates the functions of the various components of FIG. 6. An application 604 in accordance with the principles of the present disclosure runs in conjunction with operating system 603 and provides calls to operating system 603 where the calls implement the various functions or services to be performed by application 604. Application 604 may include, for example, ETL analyzer 201 (FIG. 2), schema partitioner 202 (FIG. 2), transformation engine 203 (FIG. 2) and schema collector 204 (FIG. 2). Furthermore, application 604 may include, for example, a program for optimizing a flow of data within ETL data processing pipelines as discussed further below in connection with FIGS. 7A-7B.

Referring again to FIG. 6, read-only memory ("ROM") 605 is connected to system bus 602 and includes a basic input/output system ("BIOS") that controls certain basic functions of ETL system 102. Random access memory ("RAM") 606 and disk adapter 607 are also connected to system bus 602. It should be noted that software components including operating system 603 and application 604 may be loaded into RAM 606, which may be ETL system's 102 main memory for execution. Disk adapter 607 may be an integrated drive electronics ("IDE") adapter that communicates with a disk unit 608, e.g., disk drive. It is noted that the program for optimizing a flow of data within ETL data processing pipelines, as discussed further below in connection with FIGS. 7A-7B, may reside in disk unit 608 or in application 604.

ETL system 102 may further include a communications adapter 609 connected to bus 602. Communications adapter 609 interconnects bus 602 with an outside network to communicate with other devices.

In one embodiment, application 604 of ETL system 102 includes the software components of ETL analyzer 201, schema partitioner 202, transformation engine 203 and schema collector 204. In one embodiment, such components may be implemented in hardware, where such hardware components would be connected to bus 602. The functions discussed above performed by such components are not generic computer functions. As a result, ETL system 102 is a particular machine that is the result of implementing specific, non-generic computer functions.

In one embodiment, the functionality of such software components (e.g., ETL analyzer 201, schema partitioner 202, transformation engine 203 and schema collector 204) of ETL system 102, including the functionality for optimizing a flow of data within ETL data processing pipelines, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, a properly designed ETL system extracts data from the source systems, enforces data quality and consistency standards, conforms data so that separate sources can be used together, and finally delivers data in a presentation-ready format so that application developers can build applications and end users can make decisions. Since the data extraction takes time, it is common to execute the three phases in a data processing pipeline (or simply referred to as "pipeline"). While the data is being extracted, another transformation process executes while processing the data already received and prepares it for loading while the data loading begins without waiting for the completion of the previous phases. In a traditional ETL pipeline, data is processed in batches from source databases to a target database (e.g., data warehouse). In the traditional ETL pipeline, transformations may be defined and performed on some of the database columns; whereas, transformations may not be defined and performed on other database columns. A database column (also referred to herein as simply "column"), as used herein, refers to a set of data values of a particular type, one value for each row of the database. A database column may contain text values, numbers or even pointers to files in the operating system. Database columns typically contain simple types though some relational database systems allow database columns to contain more complex data types, such as whole documents, images or video clips. Unfortunately, in traditional ETL pipelines, database columns are copied across the different stages (major divisions of the pipeline) of the ETL pipeline from the source database to the target database even though such database columns may not be transformed. Such copying results in a significant amount of input/output operations being performed which utilizes a significant amount of processing resources which results in slower performance.

The embodiments of the present disclosure provide a means for avoiding the copying of database columns that are not to be transformed in the data processing stages of a processing segment of the ETL data processing pipeline by grouping such database columns into a non-processing schema and creating a large objet data type to reference such a non-processing schema as discussed below in connection with FIGS. 7A-7B.

Figure 7A:
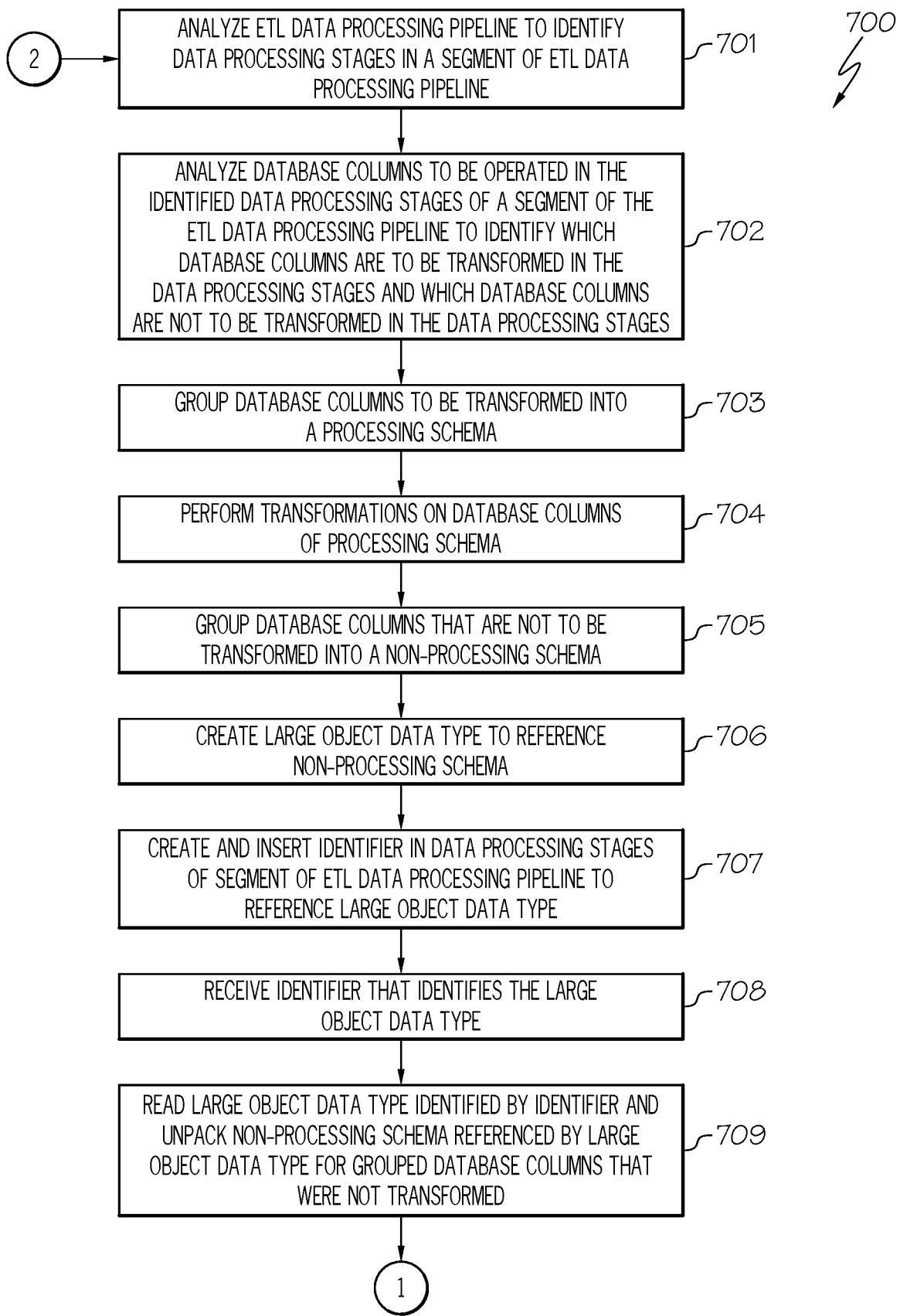
FIGS. 7A-7B are a flowchart of a method for optimizing a flow of data within the ETL data processing pipeline in accordance with an embodiment of the present disclosure.
Figure 7B:
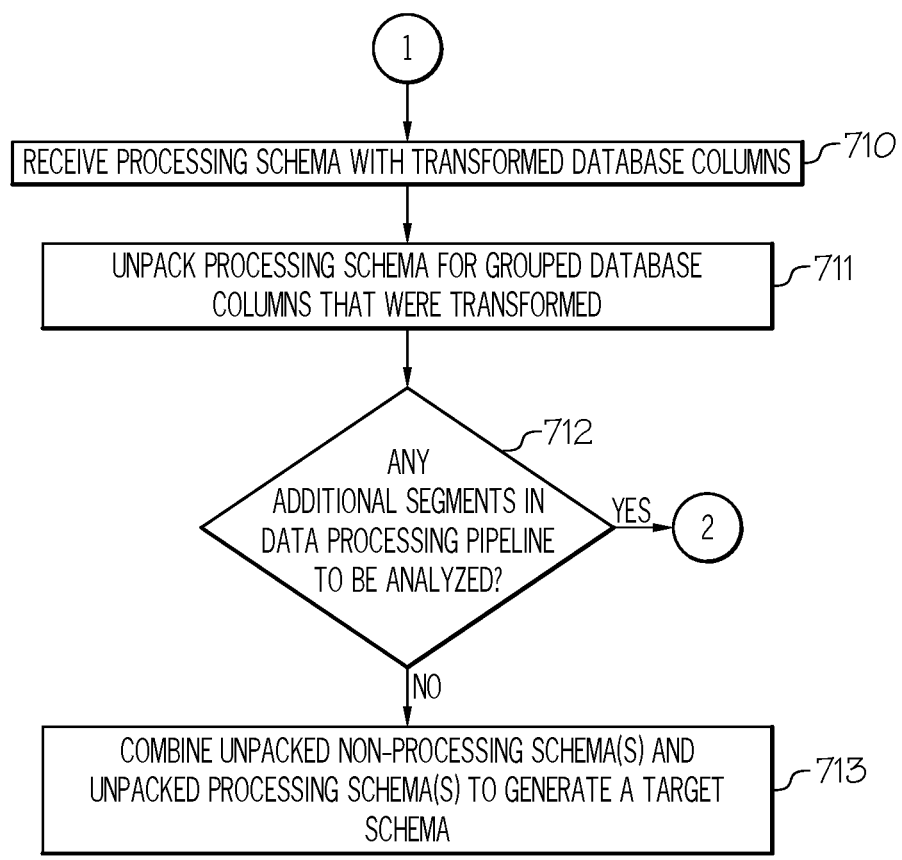

FIGS. 7A-7B are a flowchart of a method 700 for optimizing a flow of data within the ETL data processing pipeline in accordance with an embodiment of the present disclosure.

Referring to FIG. 7A, in conjunction with FIGS. 1-6, in operation 701, ETL analyzer 201 of ETL system 102 analyzes a segment of the ETL data processing pipeline to identify the data processing stages (also referred to as simply "processing stages") in the segment.

As stated above, in one embodiment, the ETL data processing pipeline represents the flow of data between source database 101 and target database 104. In one embodiment, the ETL data processing pipeline includes a set of instructions that determines how and when to move data between source database 101 and target database 104.

Furthermore, as stated above, in one embodiment, the ETL data processing pipeline includes stages or major divisions of the ETL data processing pipeline, such as the data extraction, data transformation (referred to herein as the "data processing" stage), and data loading. Examples of such an ETL analyzer 201 to identify the data processing stages include, but not limited to, Xplenty®, Talend®, Stitch, Informatica® PowerCenter®, Oracle® Data Integrator, Skyvia®, Fivetran®, etc.

In one embodiment, ETL analyzer 201 is further configured to identify the data processing stages in each segment of the ETL data processing pipeline in scenarios in which the ETL data processing pipeline includes multiple segments. A "segment" of the ETL data processing pipeline, as used herein, refers to a section or portion of the ETL data processing pipeline. In one embodiment, the ETL data processing pipeline is divided into multiple segments to perform the ETL process on different sources of data, such as performing the ETL process on historic and current data involving sales data in a shopping mall (one segment) as well as performing the ETL process to integrate the data from one organization to another organization (another segment). In one embodiment, such segments are identified based on identifying different sources of data to be extracted, transformed and loaded. Examples of such an ETL analyzer 201 to identify such segments in addition to identifying the processing stages in each segment of the ETL data processing pipeline include, but not limited to, Xplenty®, Talend®, Stitch, Informatica® PowerCenter®, Oracle® Data Integrator, Skyvia®, Fivetran®, etc.

In operation 702, schema partitioner 202 of ETL system 102 analyzes the database columns of the source data from source database 101 to be operated in the identified data processing stages (the "identified data processing stages" are referred to as simply "data processing stages" henceforth) of a segment of the ETL data processing pipeline to identify which database columns are to be transformed in the data processing stages and which database columns are not to be transformed in the data processing stages.

As stated above, in one embodiment, the ETL data processing pipeline may include multiple segments. As discussed above, ETL analyzer 201 is configured to identify the data processing stages (transformation stages) in each segment of the ETL data processing pipeline. For each segment, schema partitioner 202 identifies which database columns are to be transformed in the identified data processing stages and which database columns are not to be transformed in the identified data processing stages. A database column (also referred to herein as simply "column"), as used herein, refers to a set of data values of a particular type, one value for each row of the database. A database column may contain text values, numbers or even pointers to files in the operating system. Database columns typically contain simple types though some relational database systems allow database columns to contain more complex data types, such as whole documents, images or video clips.

In one embodiment, schema partitioner 202 determines which database columns are to be transformed and which database columns are not to be transformed based on the set of technical and business rules that have been extracted from the source(s), such as source database 101. Such technical and business rules are used to transform the source data, which also indicate which database columns are to be transformed. In such an embodiment, schema partitioner 202 utilizes natural language processing to identify such technical and business rules. In one embodiment, such rules are identified based on identifying keywords which indicate such rules, where such keywords are listed in a data structure (e.g., table). In one embodiment, such a data structure is stored in a storage device of ETL system 102 (e.g., memory 605, disk drive 608). In one embodiment, schema partitioner 202 identifies the database columns to be transformed based on identifying the identification of such database columns preceding or succeeding such identified keywords.

In one embodiment, data in the ETL data processing pipeline is transformed based on the scripting language (e.g., Python®) or domain-specific language (e.g., SQL) prepared by data analysts, data engineers and data scientists to transform the data. In one embodiment, schema partitioner 202 examines such language to determine which database columns are to be transformed and which database columns are not be transformed in the data processing stages of the segment of the ETL data processing pipeline. In one embodiment, schema partitioner 202 utilizes natural language processing to identify transformations (e.g., filtering, aggregating, data cleansing, etc.) based on identifying keywords which indicate such transformations, where such keywords are listed in a data structure (e.g., table). In one embodiment, such a data structure is stored in a storage device of ETL system 102 (e.g., memory 605, disk drive 608). In one embodiment, schema partitioner 202 identifies the database columns to be transformed based on identifying the identification of such database columns preceding or succeeding such identified keywords.

In one embodiment, schema partitioner 202 uses a machine learning algorithm (e.g., supervised learning) to build a mathematical model based on sample data consisting of data transformations (e.g., cleansing, standardization, deduplication, sorting, filtering, aggregating, bucketing, normalizing, etc.) using scripting or domain-specific languages and the database columns that were transformed. Such data may be obtained and tabulated by experts, who in turn, utilize such information to develop the sample data. Such a data set is referred to herein as the "training data" which is used by the machine learning algorithm to make predictions or decisions without being explicitly programmed to perform the task. In one embodiment, the training data consists of data transformations (e.g., cleansing, standardization, deduplication, sorting, filtering, aggregating, bucketing, normalizing, etc.) using scripting or domain-specific languages and the associated database columns that are to be transformed. The algorithm iteratively makes predictions on the training data as to which database columns are to be transformed and is corrected by the expert until the predictions achieve the desired accuracy. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the database columns to be transformed based on the process of data transformations in the scripting or domain-specific languages.

In operation 703, schema partitioner 202 of ETL system 102 groups the database columns to be transformed into a schema, referred to herein as the "processing schema."

As stated above, in one embodiment, a "schema," as used herein, refers to a structure or organization of data. In one embodiment, the schema defines the tables, fields, relationships, views, indexes, packages, procedures, functions, queues, triggers, types, sequences, materialized views, synonyms, database links, directories, etc. in the database columns.

A "processing schema," as used herein, refers to a schema for database columns that are to be processed (transformed) by transformation engine 203.

In one embodiment, schema partitioner 202 groups such database columns into the processing schema using tools, such as SQL Server Management Studio, Transact-SQL, DbSchema, SqlDBM, Visual Paradigm®, Erwin® Data Modeler, etc.

In operation 704, transformation engine 203 of ETL system 102 performs transformations on the database columns of the processing schema.

As stated above, examples of such a transformation engine 203 include, but not limited to, SQL-MapReduce®, Apache® Spark, Kafka® Streams API, etc. In one embodiment, such transformations include, but not limited to, cleansing, standardization, deduplication, sorting, filtering, aggregating, bucketing, normalizing, format revision, key restricting, derivations, joining, splitting, validation, summarization, integration, etc.

In operation 705, schema partitioner 202 of ETL system 102 groups the database columns to not be transformed into a schema, referred to herein as the "non-processing schema." A "non-processing schema," as used herein, refers to a schema for database columns that are not to be processed (transformed) by transformation engine 203.

As stated above, in one embodiment, schema partitioner 202 groups such database columns into the non-processing schema using tools, such as SQL Server Management Studio, Transact-SQL, DbSchema, SqlDBM, Visual Paradigm®, Erwin® Data Modeler, etc.

In operation 706, schema partitioner 202 of ETL system 102 creates a large object data type (LOB) to reference the non-processing schema.

As stated above, in one embodiment, the LOB is a collection of datatypes which are designed to hold a large amount of data. In one embodiment, a LOB is able to hold up to a maximum size ranging from 8 terabytes to 128 terabytes. In one embodiment, the LOB is stored in the data storage (e.g., memory 605, disk drive 608) of ETL system 102. In one embodiment, the LOB is either persistent or temporary. In one embodiment, the LOB is a read-only datatype.

In operation 707, schema partitioner 202 of ETL system 102 creates an identifier to identify the created LOB, which is inserted in the data processing stages of the segment of the ETL data processing pipeline.

As stated above, such an identifier may consist of alphanumeric characters. In one embodiment, such an identifier is inserted in the data processing stages of the segment of the ETL data processing pipeline in replace of the database columns that are not to be transformed in the data processing stages. In this manner, copying of such database columns is avoided thereby enabling such database columns to simply pass-through from source database 101 to target database 104.

In operation 708, schema collector 204 of ETL system 102 receives the identifier that identifies the LOB.

In one embodiment, schema collector 204 receives the identifier from schema partitioner 202, which has been inserted in the data processing stages of the segment of the ETL data processing pipeline, by memory mapping. For example, in one embodiment, schema partitioner 202 passes the identifier that identifies the large object data type (LOB) to schema collector 204 through memory mapping when the ETL data processing pipeline is executed on the same nodes 501. Alternatively, in one embodiment, schema partitioner 202 passes the identifier that identifies the large object data type (LOB) to schema collector 204 over a network when the source and target stages are executed on different nodes 501.

In operation 709, upon receiving such an identifier, schema collector 204 of ETL system 102 reads the large object data type (LOB) identified by the identifier and unpacks the non-processing schema referenced by the LOB for the grouped database columns that were not transformed. "Unpacking," as used herein, refers to removing the contents of the schema, such as the non-processing schema, in order to obtain the structure/organization of data for those database columns of the non-processing schema.

Referring now to FIG. 7B, in conjunction with FIGS. 1-6, in operation 710, schema collector 204 of ETL system 102 further receives the processing schema with transformed database columns from transformation engine 203 (database columns transformed in operation 704). That is, schema collector 204 receives the database columns that were transformed by transformation engine 203 from transformation engine 203.

In operation 711, schema collector 204 of ETL system 102 unpacks the processing schema for the grouped database columns that were transformed. "Unpacking," as used herein, refers to removing the contents of the schema, such as the processing schema, in order to obtain the structure/organization of data for those database columns of the processing schema.

In operation 712, a determination is made by schema partitioner 202 of ETL system 102 as to whether there are any additional segments in the data processing pipeline to be analyzed to identify the data processing stages.

If there are additional segments in the data processing pipeline to be analyzed, then ETL analyzer 201 analyzes an additional segment of the ETL data processing pipeline to identify the data processing stages in that segment in operation 701.

If, however, there are no further additional segments in the data processing pipeline that need to be analyzed, then, in operation 713, schema collector 204 of ETL system 102 combines the unpacked non-processing schema(s) and the unpacked processing schema(s) to generate a "target schema." A "target schema," as used herein, refers to a schema for target database 104. That is, the target schema refers to the structure or organization of data to be stored in target database 104.

As a result of the foregoing, embodiments of the present disclosure provide a means for avoiding the copying of database columns that are not to be transformed in the data processing stages of a processing segment of the ETL data processing pipeline by grouping such database columns into a non-processing schema and creating a large objet data type to reference such a non-processing schema. An identifier that references the large object data type is inserted in the data processing stages as opposed to the database columns that are not to be transformed thereby avoiding the copying of such database columns resulting in a reduction of processing resources being used in the execution of the ETL data processing pipeline.

Furthermore, the principles of the present disclosure improve the technology or technical field involving extract, transform, load (ETL) data processing pipelines. As discussed above, a properly designed ETL system extracts data from the source systems, enforces data quality and consistency standards, conforms data so that separate sources can be used together, and finally delivers data in a presentation-ready format so that application developers can build applications and end users can make decisions. Since the data extraction takes time, it is common to execute the three phases in a data processing pipeline (or simply referred to as "pipeline"). While the data is being extracted, another transformation process executes while processing the data already received and prepares it for loading while the data loading begins without waiting for the completion of the previous phases. In a traditional ETL pipeline, data is processed in batches from source databases to a target database (e.g., data warehouse). In the traditional ETL pipeline, transformations may be defined and performed on some of the database columns; whereas, transformations may not be defined and performed on other database columns. A database column (also referred to herein as simply "column"), as used herein, refers to a set of data values of a particular type, one value for each row of the database. A database column may contain text values, numbers or even pointers to files in the operating system. Database columns typically contain simple types though some relational database systems allow database columns to contain more complex data types, such as whole documents, images or video clips. Unfortunately, in traditional ETL pipelines, database columns are copied across the different stages (major divisions of the pipeline) of the ETL pipeline from the source database to the target database even though such database columns may not be transformed. Such copying results in a significant amount of input/output operations being performed which utilizes a significant amount of processing resources which results in slower performance.

Embodiments of the present disclosure improve such technology by identifying the database columns from a source database that are to be transformed in the data processing stages of a processing segment of an ETL data processing pipeline as well as the database columns from the source database that are not to be transformed in the data processing stages of the processing segment of the ETL data processing pipeline. A "segment" of the ETL data processing pipeline, as used herein, refers to a section or portion of the ETL data processing pipeline. Those database columns that are to be transformed are grouped into a processing schema. A "schema," as used herein, refers to a structure or organization of data. A "processing schema," as used herein, refers to a schema for database columns that are to be processed (transformed). Transformations are then performed on the database columns of the processing schema. Furthermore, those database columns that are not to be transformed are grouped into a non-processing schema. A "non-processing schema," as used herein, refers to a schema for database columns that are not to be processed (transformed). A large object data type (LOB) is then created to reference the non-processing schema. In one embodiment, the LOB is a collection of datatypes which are designed to hold a large amount of data. Furthermore, an identifier is created and inserted in the data processing stages to identify the LOB in replace of the database columns that are not to be transformed thereby avoiding the copying of the database columns that are not to be transformed in the data processing stages. In this manner, the copying of such database columns is avoided thereby enabling such database columns to simply pass-through from the source database to the target database. As a result, there is a reduction in the processing resources being used in the execution of the ETL data processing pipeline. Furthermore, in this manner, there is an improvement in the technical field involving ETL data processing pipelines.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for optimizing a flow of data within extract, transform, load (ETL) data processing pipelines, the method comprising:
   identifying which database columns from a source database are to be transformed in data processing stages of a processing segment of a ETL data processing pipeline and which database columns from said source database are not to be transformed in said data processing stages of said processing segment of said ETL data processing pipeline;
   grouping database columns to be transformed into a processing schema;
   performing transformations on said database columns of said processing schema;
   grouping database columns that are not be transformed into a non-processing schema;
   creating a large object data type to reference said non-processing schema; and
   creating and inserting an identifier in said data processing stages to identify said large object data type thereby avoiding copying of said database columns that are not to be transformed in said data processing stages.

2. The method as recited in claim 1 further comprising:
   receiving said identifier; and
   reading said large object data type identified by said identifier.

3. The method as recited in claim 2 further comprising:
   unpacking said non-processing schema referenced by said large object data type for said grouped database columns that were not transformed.

4. The method as recited in claim 3 further comprising:
   receiving said processing schema with transformed database columns; and
   unpacking said processing schema for said grouped database columns that were transformed.

5. The method as recited in claim 4 further comprising:
   combining said unpacked non-processing schema and said unpacked processing schema to generate a target schema.

6. The method as recited in claim 1 further comprising:
   analyzing said ETL data processing pipeline to identify data processing stages of said processing segment of said ETL data processing pipeline; and
   identifying which database columns from said source database are to be transformed in said identified data processing stages and which database columns from said source database are not to be transformed in said identified data processing stages.

7. The method as recited in claim 1, wherein which database columns from said source database are to be transformed in said data processing stages of said processing segment of said ETL data processing pipeline and which database columns from said source database are not to be transformed in said data processing stages of said processing segment of said ETL data processing pipeline are determined using a machine learning model.

8. A computer program product for optimizing a flow of data within extract, transform, load (ETL) data processing pipelines, the computer program product comprising one or more computer readable storage mediums having program code embodied therewith, the program code comprising programming instructions for:
   identifying which database columns from a source database are to be transformed in data processing stages of a processing segment of a ETL data processing pipeline and which database columns from said source database are not to be transformed in said data processing stages of said processing segment of said ETL data processing pipeline;
   grouping database columns to be transformed into a processing schema;
   performing transformations on said database columns of said processing schema;
   grouping database columns that are not be transformed into a non-processing schema;
   creating a large object data type to reference said non-processing schema; and
   creating and inserting an identifier in said data processing stages to identify said large object data type thereby avoiding copying of said database columns that are not to be transformed in said data processing stages.

9. The computer program product as recited in claim 8, wherein the program code further comprises the programming instructions for:
   receiving said identifier; and
   reading said large object data type identified by said identifier.

10. The computer program product as recited in claim 9, wherein the program code further comprises the programming instructions for:
   unpacking said non-processing schema referenced by said large object data type for said grouped database columns that were not transformed.

11. The computer program product as recited in claim 10, wherein the program code further comprises the programming instructions for:
   receiving said processing schema with transformed database columns; and
   unpacking said processing schema for said grouped database columns that were transformed.

12. The computer program product as recited in claim 11, wherein the program code further comprises the programming instructions for:
   combining said unpacked non-processing schema and said unpacked processing schema to generate a target schema.

13. The computer program product as recited in claim 8, wherein the program code further comprises the programming instructions for:
   analyzing said ETL data processing pipeline to identify data processing stages of said processing segment of said ETL data processing pipeline; and
   identifying which database columns from said source database are to be transformed in said identified data processing stages and which database columns from said source database are not to be transformed in said identified data processing stages.

14. The computer program product as recited in claim 8, wherein which database columns from said source database are to be transformed in said data processing stages of said processing segment of said ETL data processing pipeline and which database columns from said source database are not to be transformed in said data processing stages of said processing segment of said ETL data processing pipeline are determined using a machine learning model.

15. A system, comprising:
   a memory for storing a computer program for optimizing a flow of data within extract, transform, load (ETL) data processing pipelines; and
   a processor connected to said memory, wherein said processor is configured to execute program instructions of the computer program comprising:
      identifying which database columns from a source database are to be transformed in data processing stages of a processing segment of a ETL data processing pipeline and which database columns from said source database are not to be transformed in said data processing stages of said processing segment of said ETL data processing pipeline;
      grouping database columns to be transformed into a processing schema;
      performing transformations on said database columns of said processing schema;
      grouping database columns that are not be transformed into a non-processing schema;
      creating a large object data type to reference said non-processing schema; and
      creating and inserting an identifier in said data processing stages to identify said large object data type thereby avoiding copying of said database columns that are not to be transformed in said data processing stages.

16. The system as recited in claim 15, wherein the program instructions of the computer program further comprise:
   receiving said identifier; and
   reading said large object data type identified by said identifier.

17. The system as recited in claim 16, wherein the program instructions of the computer program further comprise:
   unpacking said non-processing schema referenced by said large object data type for said grouped database columns that were not transformed.

18. The system as recited in claim 17, wherein the program instructions of the computer program further comprise:
   receiving said processing schema with transformed database columns; and
   unpacking said processing schema for said grouped database columns that were transformed.

19. The system as recited in claim 18, wherein the program instructions of the computer program further comprise:
   combining said unpacked non-processing schema and said unpacked processing schema to generate a target schema.

20. The system as recited in claim 15, wherein the program instructions of the computer program further comprise:
- analyzing said ETL data processing pipeline to identify data processing stages of said processing segment of said ETL data processing pipeline; and
- identifying which database columns from said source database are to be transformed in said identified data processing stages and which database columns from said source database are not to be transformed in said identified data processing stages.

* * * * *